US012782956B2

(12) United States Patent
Iwahori

(10) Patent No.: US 12,782,956 B2
(45) Date of Patent: Nov. 3, 2026

(54) CONTROL DEVICE FOR CONTROLLING OPERATION OF MOVING OBJECT

(71) Applicant: TOYOTA JIDOSHA KABUSHIKI KAISHA, Toyota (JP)

(72) Inventor: Kento Iwahori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/039,988

(22) Filed: Jan. 29, 2025

(65) Prior Publication Data

US 2026/0010162 A1 Jan. 8, 2026

(30) Foreign Application Priority Data

Jul. 2, 2024 (JP) ................................ 2024-106663

(51) Int. Cl.

| | |
|---|---|
| ***G05D 1/249*** | (2024.01) |
| ***B62D 65/18*** | (2006.01) |
| ***G05D 1/225*** | (2024.01) |
| ***G05D 1/622*** | (2024.01) |
| ***G05D 107/70*** | (2024.01) |

(52) U.S. Cl.

CPC ............. *G05D 1/249* (2024.01); *B62D 65/18* (2013.01); *G05D 1/225* (2024.01); *G05D 1/622* (2024.01); *G05D 2107/70* (2024.01)

(58) Field of Classification Search

None

See application file for complete search history.

(56) References Cited

U.S. PATENT DOCUMENTS

2018/0188359 A1* 7/2018 Droz ...................... G05D 1/247
2020/0218253 A1* 7/2020 Ramamurthy ....... G05D 1/0022
2021/0149398 A1* 5/2021 Hu ......................... G05D 1/228
2022/0109985 A1* 4/2022 Yoo ........................ G05B 19/04

FOREIGN PATENT DOCUMENTS

JP 2018-043616 A 3/2018
WO WO-2020135365 A1 * 7/2020 ............. G05D 1/021

OTHER PUBLICATIONS

English translation of description of WO 2020135365 A1, retrieved from Espacenet on Mar. 11, 2026 (Year: 2026).*

* cited by examiner

*Primary Examiner* — Amelia Vorce
(74) *Attorney, Agent, or Firm* — SoraIP, Inc.

(57) ABSTRACT

A control device controls operation of a moving object movable by unmanned driving. The control device acquires moving object information including condition information or characteristic information of the moving object. Based on the acquired information, the control device selectively performs a first process for controlling the operation of the moving object at a predetermined first time interval, a second process for controlling the operation of the moving object at a second time interval shorter than the first time interval, or a third process for controlling the moving object without waiting for a predetermined time interval. The control device thereby controls the moving object at an appropriate timing according to a condition or characteristic of the moving object.

2 Claims, 8 Drawing Sheets

CONTROL DEVICE FOR CONTROLLING OPERATION OF MOVING OBJECT

CROSS-REFERENCE TO RELATED APPLICATION

This application claims priority to Japanese Patent Application No. 2024-106663 filed on Jul. 2, 2024. The disclosure of the above-identified application, including the specification, drawings, and claims, is incorporated by reference herein in its entirety.

BACKGROUND

1. Technical Field

The present disclosure relates to a control device.

2. Description of Related Art

Hitherto, a self-propelled vehicle controlled by a routine repeatedly executed at predetermined time intervals is known (Japanese Unexamined Patent Application Publication No. 2018-43616 (JP 2018-43616 A)).

SUMMARY

In the related art, the operation of the vehicle is controlled at every predetermined time period. Therefore, there is a possibility that the timing of controlling the operation of the vehicle is delayed by the predetermined time period at the maximum. Thus, there is a need for a technology capable of controlling the operation of the vehicle at an appropriate timing depending on traveling conditions and characteristics of the vehicle. Not only vehicles but also moving objects have the same issue.

The present disclosure can be realized in the following aspects.

(1) According to one aspect of the present disclosure, a control device is provided.

The control device configured to control an operation of a moving object movable by unmanned driving includes:

an acquisition unit configured to acquire moving object information that is at least either of condition information on a movement condition of the moving object and characteristic information on a characteristic of the moving object; and a control unit configured to control the operation of the moving object by performing, using the moving object information, at least one process out of (i) a first process of controlling the operation of the moving object at a predetermined first time period, (ii) a second process of controlling the operation of the moving object at a second time period shorter than the first time period, and (iii) a third process of controlling the operation of the moving object at any timing without a predetermined time period. According to this aspect, by performing the second process, the control device can increase the possibility that the operation of the moving object can be changed more quickly than in the case of performing the first process. Thus, the control device can reduce the possibility that the timing of controlling the operation of the moving object is delayed by the first time period at the maximum. Further, the control device can quickly change the operation of the moving object by performing the third process. Thus, the control device can further reduce the possibility that the timing of controlling the operation of the moving object is delayed by the first time period at the maximum. Accordingly, the control device can control the operation of the moving object at an appropriate timing by selectively using the plurality of processes for controlling the operation of the moving object depending on at least either of the movement condition of the moving object and the characteristic of the moving object.

(2) In the above aspect, the acquisition unit may be configured to acquire information on a position of the moving object as the condition information, the control unit may be configured to perform the first process when the moving object is located in a first area, and the control unit may be configured to perform at least either of the second process and the third process when the moving object is located in a second area having a higher risk than the first area. According to this aspect, when the moving object is located in the second area having a higher risk than the first area, the control device can perform the second process or the third process that can reduce, compared with the first process, the possibility that the timing of controlling the operation of the moving object is delayed. Accordingly, the control device can control the operation of the moving object at an appropriate timing by selectively using the plurality of processes for controlling the operation of the moving object depending on the area where the moving object is located.

(3) In the above aspect, the acquisition unit may be configured to acquire, as the condition information, information on a time frame in which the moving object moves, the control unit may be configured to perform the first process when the moving object moves in a first time frame, and the control unit may be configured to perform at least either of the second process and the third process when the moving object moves in a second time frame having a higher risk than the first time frame. According to this aspect, when the moving object moves in the second time frame having a higher risk than the first time frame, the control device can perform the second process or the third process that can reduce, compared with the first process, the possibility that the timing of controlling the operation of the moving object is delayed. Accordingly, the control device can control the operation of the moving object at an appropriate timing by selectively using the plurality of processes for controlling the operation of the moving object depending on the time frame in which the moving object moves.

(4) In the above aspect, the acquisition unit may be configured to acquire, as the characteristic information, information on a type of the moving object, the control unit may be configured to perform the first process when the type of the moving object is a first type, and the control unit may be configured to perform at least either of the second process and the third process when the type of the moving object is a second type having a higher risk than the first type. According to this aspect, when the type is the second type having a higher risk than the first type, the control device can perform the second process or the third process that can reduce, compared with the first process, the possibility that the timing of controlling the operation of the moving object is delayed. Accordingly, the control device can control the operation of the moving object at an appropriate timing by selectively using the plurality of processes for controlling the operation of the moving object depending on the type of the moving object.

(5) In the above aspect, the control device may further include a determination unit configured to determine the process associated with the moving object information among the first process, the second process, and the third process using a database in which a type of the process to be performed among the first process, the second process, and the third process is associated with at least either of the movement condition of the moving object and the characteristic of the moving object. According to this aspect, the control device can determine the process associated with the movement condition of the moving object or the characteristic of the moving object using the database in which the type of the process to be performed is associated with at least either of the movement condition of the moving object and the characteristic of the moving object.

The present disclosure can be realized in various forms other than the above-described control device. For example, the present disclosure can be realized by a system including the control device and the moving object, and methods for manufacturing the control device and the system. Further, the present disclosure can be realized in the form of a method for controlling the control device and the system, a computer program for implementing the control method, a non-transitory recording medium storing the computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
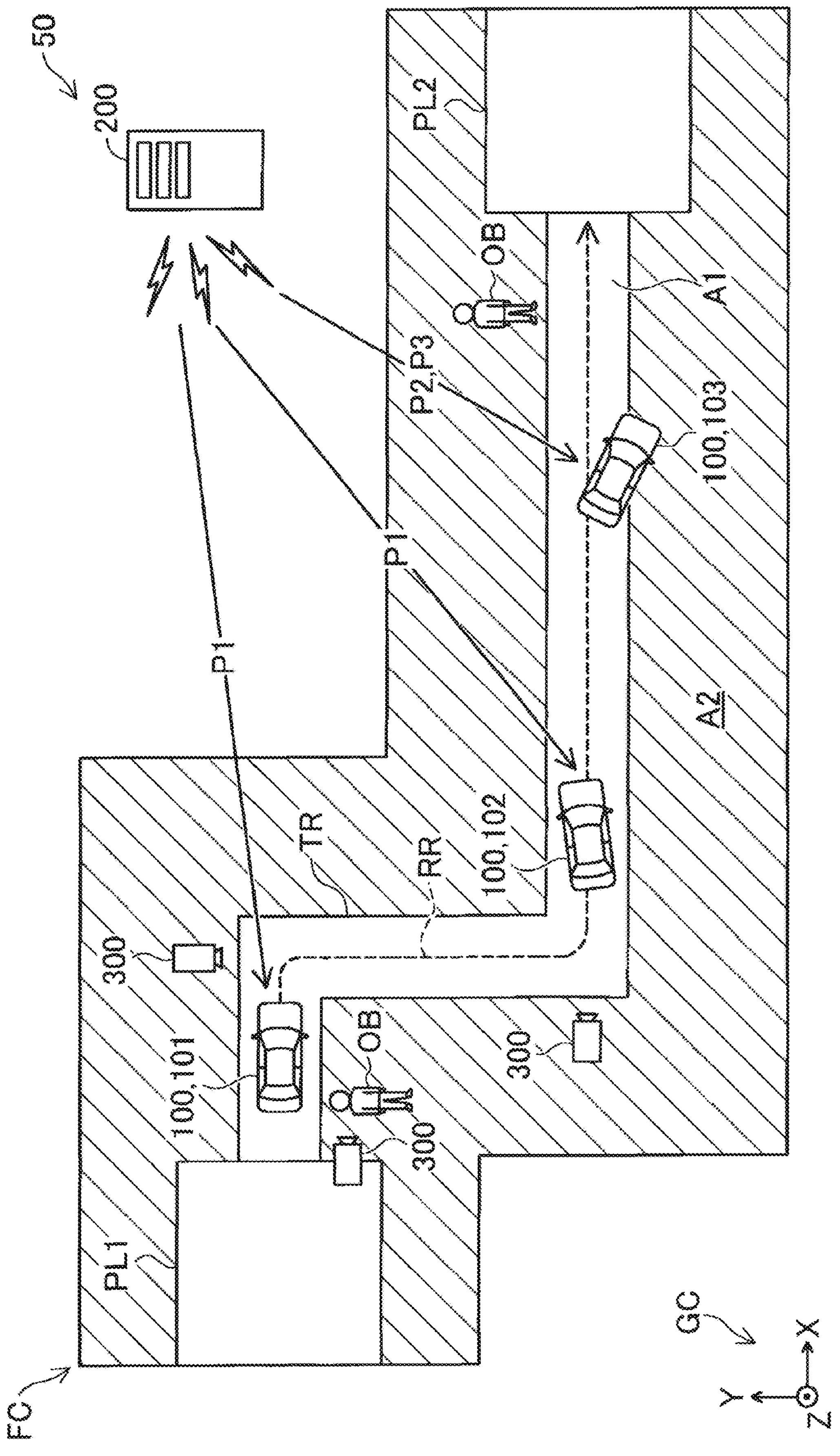
FIG. 1 is a conceptual diagram showing a configuration of a system according to a first embodiment.

FIG. 1 is a conceptual diagram illustrating a configuration of a system 50 according to a first embodiment. The system 50 includes one or more vehicles 100 as a moving object, a server 200, and one or more external sensors 300. In the present embodiment, the function of the "control device" in the present disclosure is realized by the server 200.

In the present disclosure, "moving object" means a movable object, and is, for example, a vehicle or an electric vertical takeoff and landing machine (a so-called flying vehicle). The vehicle may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles include battery electric vehicles (BEVs), gasoline-powered vehicles, hybrid electric vehicles, and fuel cell electric vehicles. When the moving object is other than the vehicle, the expressions of "vehicle" and "vehicle" in the present disclosure can be appropriately replaced with "moving object", and the expression of "traveling" can be appropriately replaced with "moving".

The vehicle 100 is configured to be able to travel by unmanned driving. The term "unmanned driving" means driving that does not depend on the traveling operation of the passenger. The traveling operation means an operation related to at least one of "running", "turning", and "stopping" of the vehicle 100. The unmanned driving is realized by automatic or manual remote control using a device located outside the vehicle 100 or by autonomous control of the vehicle 100. A passenger who does not perform the traveling operation may be on the vehicle 100 traveling by the unmanned driving. The passenger who does not perform the traveling operation includes, for example, a person who is simply seated on the seat of the vehicle 100 and a person who performs a work different from the traveling operation such as an assembling operation, an inspection operation, and an operation of switches while riding on the vehicle 100. Driving by the traveling operation of the occupant is sometimes referred to as "manned driving".

Herein, "remote control" includes "full remote control" in which all of the operations of the vehicle 100 are completely determined from the outside of the vehicle 100, and "partial remote control" in which a part of the operations of the vehicle 100 is determined from the outside of the vehicle 100. In addition, "autonomous control" includes "fully autonomous control" and "partially autonomous control". The "complete autonomous control" is a control in which the vehicle 100 autonomously controls its operation without receiving any information from a device outside the vehicle 100. The "partial autonomous control" is a control in which the vehicle 100 autonomously controls its own operation using information received from a device outside the vehicle 100.

In the present embodiment, the system 50 is used in a factory FC that manufactures the vehicles 100. The reference coordinate system of the factory FC is a global coordinate system GC, and any position in the factory FC can be represented by the coordinates of X, Y, Z in the global coordinate system GC. The factory FC includes a first location PL1 and a second location PL2. The first location PL1 and the second location PL2 are connected by a traveling road TR on which the vehicles 100 can travel. In the factory FC, a plurality of external sensors 300 are installed along the traveling road TR. The positions of the external sensors 300 in the factory FC are adjusted in advance. The vehicles 100 travel through the traveling road TR from the first location PL1 to the second location PL2 by unmanned driving.

Figure 2:
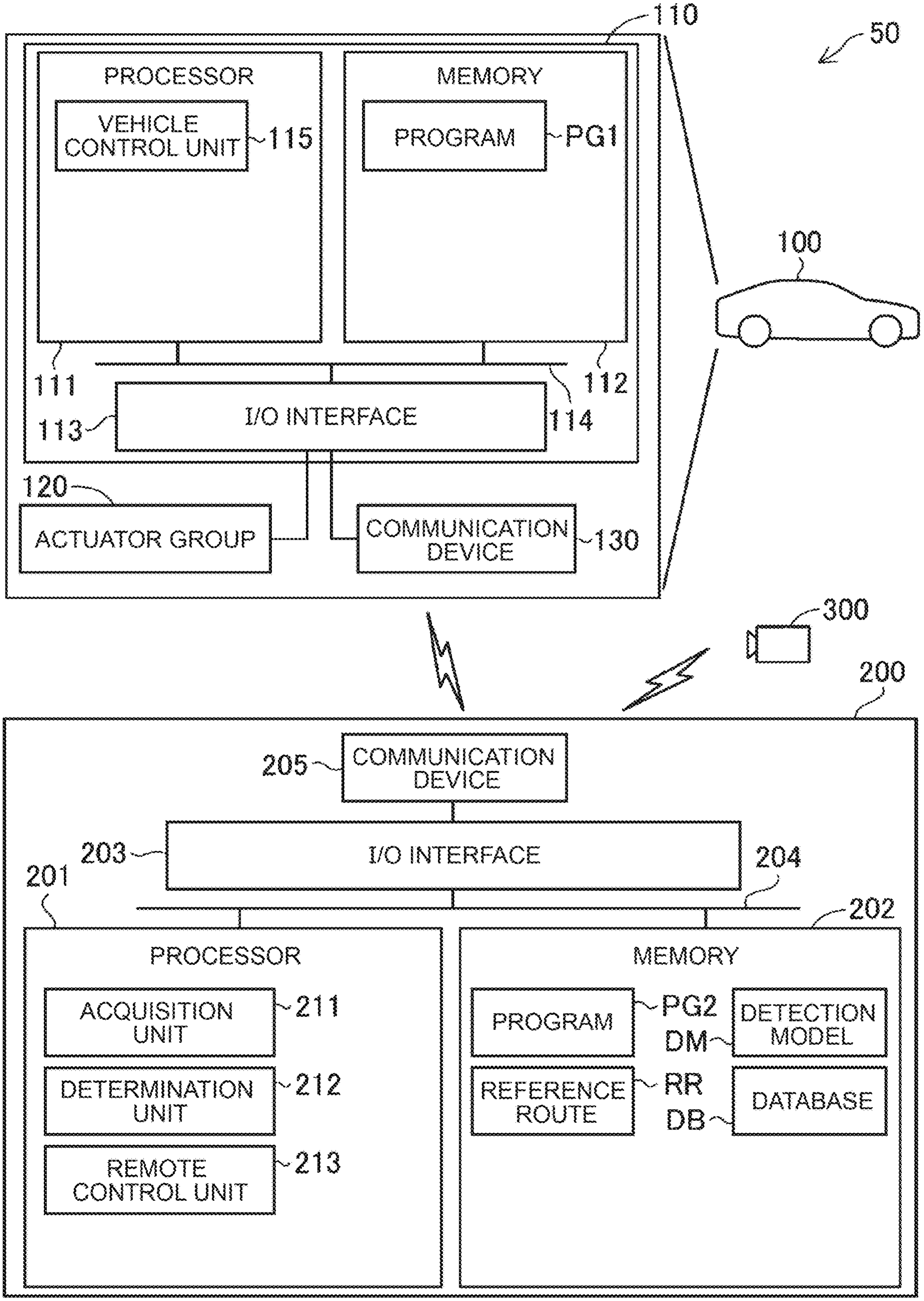
FIG. 2 is a block diagram illustrating a configuration of a system.

FIG. 2 is a block diagram illustrating a configuration of the system 50. The vehicle 100 includes a vehicle control device 110 for controlling each unit of the vehicle 100, and an actuator group 120 including one or more actuators driven under the control of the vehicle control device 110. The vehicle 100 further includes a communication device 130 for wirelessly communicating with an external device such as the server 200. The actuator group 120 includes an actuator of a driving device for accelerating the vehicle 100, an actuator of a steering device for changing a traveling direction of the vehicle 100, and an actuator of a braking device for decelerating the vehicle 100.

The vehicle control device 110 includes a computer including a processor 111, a memory 112, an input/output interface 113, and an internal bus 114. The processor 111, the memory 112, and the input/output interface 113 are bidirectionally communicably connected via an internal bus 114. An actuator group 120 and a communication device 130 are connected to the input/output interface 113. The processor 111 executes the program PG1 stored in the memory 112 to realize various functions including functions as the vehicle control unit 115.

The vehicle control unit 115 controls the actuator group 120 to cause the vehicle 100 to travel. The vehicle control unit 115 controls the operation of the vehicle 100 by controlling the actuator group 120 using the control signal received from the server 200. Specifically, the vehicle control unit 115 can cause the vehicle 100 to travel by controlling the actuator group 120 using the travel control signal received from the server 200. The travel control signal is a control signal for causing the vehicle 100 to travel. In the present embodiment, the travel control signal includes the acceleration and the steering angle of the vehicle 100 as parameters. In other embodiments, the travel control signal may include the speed of the vehicle 100 as a parameter in place of or in addition to the acceleration of the vehicle 100. Further, the vehicle control unit 115 can stop the vehicle 100 by controlling the actuator group 120 using the stop signal received from the server 200. The stop signal is a control signal for stopping the vehicle 100. The stop signal includes, for example, at least a negative acceleration of the vehicle 100 as a parameter. In other embodiments, the stop signal may include the speed of the vehicle 100 as a parameter in place of or in addition to the acceleration of the vehicle 100. The stop signal may include the steering angle of the vehicle 100 as a parameter.

The server 200 includes a computer including a processor 201, a memory 202, an input/output interface 203, and an internal bus 204. The processor 201, the memory 202, and the input/output interface 203 are bidirectionally communicably connected via an internal bus 204. A communication device 205 for communicating with various devices external to the server 200 is connected to the input/output interface 203. The communication device 205 can communicate with the vehicle 100 by wireless communication, and can communicate with each external sensor 300 by wired communication or wireless communication. The processor 201 executes the program PG2 stored in the memory 202 to realize various functions including the functions of the acquisition unit 211, the determination unit 212, and the remote control unit 213.

The acquisition unit 211 acquires vehicle information of at least one of status information related to a traveling state of the vehicle 100 and characteristic information related to a characteristic of the vehicle 100. In the present embodiment, in order to specify the area A1, A2 in which the vehicle 100 is located, the acquisition unit 211 acquires information regarding the position of the vehicle 100 as status information. The acquisition unit 211 acquires, for example, coordinates indicating the position of the vehicle 100 as information related to the position of the vehicle 100.

The determination unit 212 uses the database DB stored in the memory 202 to identify, from among the first process P1, the second process P2, and the third process P3, the processes P1 to P3 corresponding to the vehicle information. The first process P1 is a process for controlling the operation of the vehicles 100 at a predetermined first time-period. The second process P2 is a process for controlling the operation of the vehicles 100 in the second time period shorter than the first time period. The third process P3 is a process for controlling the operation of the vehicles 100 at any timing without having a predetermined time period. In the database DB, from the process P1 executed among the first process P1, the second process P2, and the third process P3, the type of P3 is associated with at least one of the traveling state of the vehicle 100 and the characteristic of the vehicle 100. In the database DB according to the present embodiment, the types of the processes P1 to P3 executed among the first process P1, the second process P2, and the third process P3 are associated with each area A1, A2. The second area A2 is an area where the collision risk is higher than the first area A1. The collision risk indicates a possibility that the vehicles 100 collide with the obstacle OB. The obstacle OB is, for example, a person, a facility, or a moving object. The moving objects include, for example, transportation vehicles such as trucks and trailers, carts, and AGV. The second area A2 is, for example, an area in which the number of obstacle OB existing in the area A1, A2 is larger than the number of the first area A1. As described above, the more obstacle OB present in each area A1, A2, the higher the collision risk. For example, the number of obstacles OB in the area A1, A2 can be specified by using a table indicating the number of obstacles OB for each area A1, A2. The number of obstacles OB present in the area A1, A2 may be determined by detecting an object present in the area A1, A2 using a sensor. In the database DB, the first process P1 is associated with the first area A1. At least one of the second process P2 and the third process P3 is associated with the second area A2.

In the present embodiment, the determination unit 212 specifies in which area A1, A2 the vehicle 100 is located among the first area A1 and the second area A2 by using the information related to the position of the vehicle 100 acquired by the acquisition unit 211. Then, the determination unit 212 specifies, in the database DB, the process P1 to P3 of the type associated with the area A1, A2 specified as the area A1, A2 in which the vehicles 100 are located, as the process P1 to P3 to be executed by the remote control unit 213.

The remote control unit 213 controls the operation of the vehicle 100 by performing, using the vehicle information, at least one process P1 to P3 out of the first process P1, the second process P2, and the third process P3. In the present embodiment, the remote control unit 213 controls the operation of the vehicle 100 by executing a P3 from the process P1 corresponding to the area A1, A2 specified by the determination unit 212 using the information regarding the position of the vehicle 100. Specifically, when the vehicles 100 are located in the first area A1, the remote control unit 213 executes the first process P1. When the vehicle 100 is located in the second area A2, the remote control unit 213 executes at least one of the second process P2 and the third process P3.

The external sensor 300 is a sensor located outside the vehicle 100. The external sensor 300 in the present embodiment is a sensor that captures the vehicle 100 from the outside of the vehicle 100. The external sensor 300 includes a communication device (not shown), and can communicate with another device such as the server 200 by wired communication or wireless communication.

Specifically, the external sensor 300 is constituted by a camera. The camera as the external sensor 300 captures an image of the vehicle 100 and outputs a captured image as a detection result.

Figure 3:
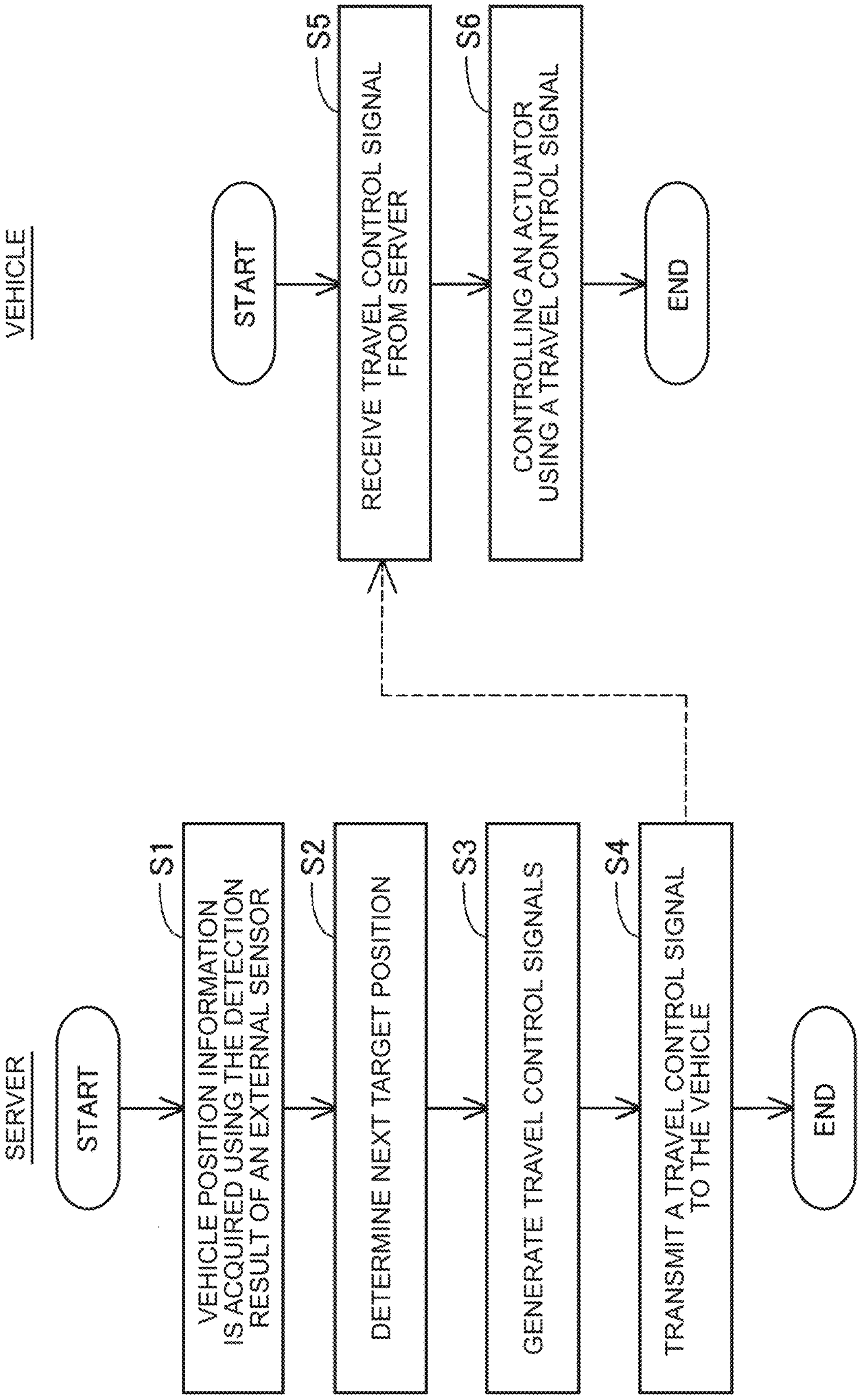
FIG. 3 is a flowchart illustrating a processing procedure of travel control of a vehicle according to the first embodiment.

FIG. 3 is a flowchart illustrating a processing procedure of travel control of the vehicle 100 according to the first embodiment. In the process of FIG. 3, the processor 201 of the server 200 functions as the remote control unit 213 by executing the program PG2. The processor 111 of the vehicle 100 functions as the vehicle control unit 115 by executing the program PG1.

In S1, the processor 201 of the server 200 acquires the vehicle position information using the detection result outputted from the external sensor 300. The vehicle position information is position information that is a basis for generating a travel control signal. In the present embodiment, the vehicle position information includes the position and orientation of the vehicle 100 in the global coordinate system GC of the factory FC. Specifically, in S1, the processor 201 acquires vehicle-position data using captured images acquired from cameras that are the external sensors 300.

Specifically, in S1, the processor 201 detects the external shape of the vehicle 100 from the captured images, for example. Further, the processor 201 calculates the coordinates of the positioning point of the vehicle 100 in the coordinate system of the captured image, that is, the local coordinate system. Further, the processor 201 obtains the position of the vehicle 100 by converting the calculated coordinates into coordinates in the global coordinate system GC. The outline of the vehicle 100 included in the captured image can be detected by, for example, inputting the captured image into a detection model DM using artificial intelligence. The detection model DM is prepared in the system 50 or outside the system 50, for example, and stored in the memory 202 of the server 200 in advance. Examples of the detection model DM include a learned machine learning model that is learned so as to realize one of semantic segmentation and instance segmentation. As the machine learning model, for example, a convolutional neural network (hereinafter referred to as a CNN) learned by supervised learning using a learning dataset can be used. The training data set includes, for example, a plurality of training images including the vehicle 100 and a label indicating which of the regions in the training image indicates the vehicle 100 and the regions other than the vehicle 100. When CNN is learned, the parameters of CNN are preferably updated by back propagation so as to reduce the error between the output-result and-label due to the detection model DM. Further, the processor 201 estimates, for example, based on the orientation of the movement vector of the vehicle 100 calculated from the positional change of the feature point of the vehicle 100 between the frames of the captured image by using the optical flow method. Thus, the processor 201 can acquire the orientation of the vehicle 100.

In S2, the processor 201 of the servers 200 determines the target location to which the vehicles 100 should be heading next. In the present embodiment, the target position is represented by the coordinates of X, Y, Z in the global coordinate system GC. In the memories 202 of the servers 200, reference route RR that is a route on which the vehicles 100 should travel is stored in advance. The route is represented by a node indicating a starting point, a node indicating a passing point, a node indicating a destination, and a link connecting the respective nodes. The processor 201 uses the vehicle position information and the reference route RR to determine the target position to which the vehicle 100 is to be directed next. The processor 201 determines the target position on the reference route RR ahead of the current position of the vehicles 100.

In S3, the processor 201 of the server 200 generates a travel control signal for causing the vehicle 100 to travel toward the determined target position. The processor 201 calculates the traveling speed of the vehicle 100 from the transition of the position of the vehicle 100, and compares the calculated traveling speed with the target speed. The processor 201 generally determines the acceleration so that the vehicle 100 accelerates when the travel speed is lower than the target speed, and determines the acceleration so that the vehicle 100 decelerates when the travel speed is higher than the target speed. In addition, the processor 201 determines the steering angle and the acceleration so that the vehicle 100 does not deviate from the reference route RR when the vehicle 100 is located on the reference route RR. Also, if the vehicle 100 is not located on the reference route RR, in other words, if the vehicle 100 deviates from the reference route RR, the processor 201 determines the steering angle and the acceleration so that the vehicle 100 returns to the reference route RR.

In S4, the processor 201 of the servers 200 transmits the generated travel control signal to the vehicles 100. The processor 201 repeats acquisition of vehicle position information, determination of a target position, generation of a travel control signal, transmission of a travel control signal, and the like at predetermined intervals.

In S5, the processor 111 of the vehicle 100 receives the travel control signal transmitted from the server 200. In S6, the processor 111 of the vehicle 100 controls the actuator group 120 using the received travel control signal, thereby causing the vehicle 100 to travel at the acceleration and the steering angle represented by the travel control signal. The processor 111 repeatedly receives the travel control signal and controls the actuator group 120 at a predetermined cycle. According to the system 50 of the present embodiment, the vehicle 100 can be driven by remote control, and the vehicle 100 can be moved without using a conveyance facility such as a crane or a conveyor.

Figure 4:
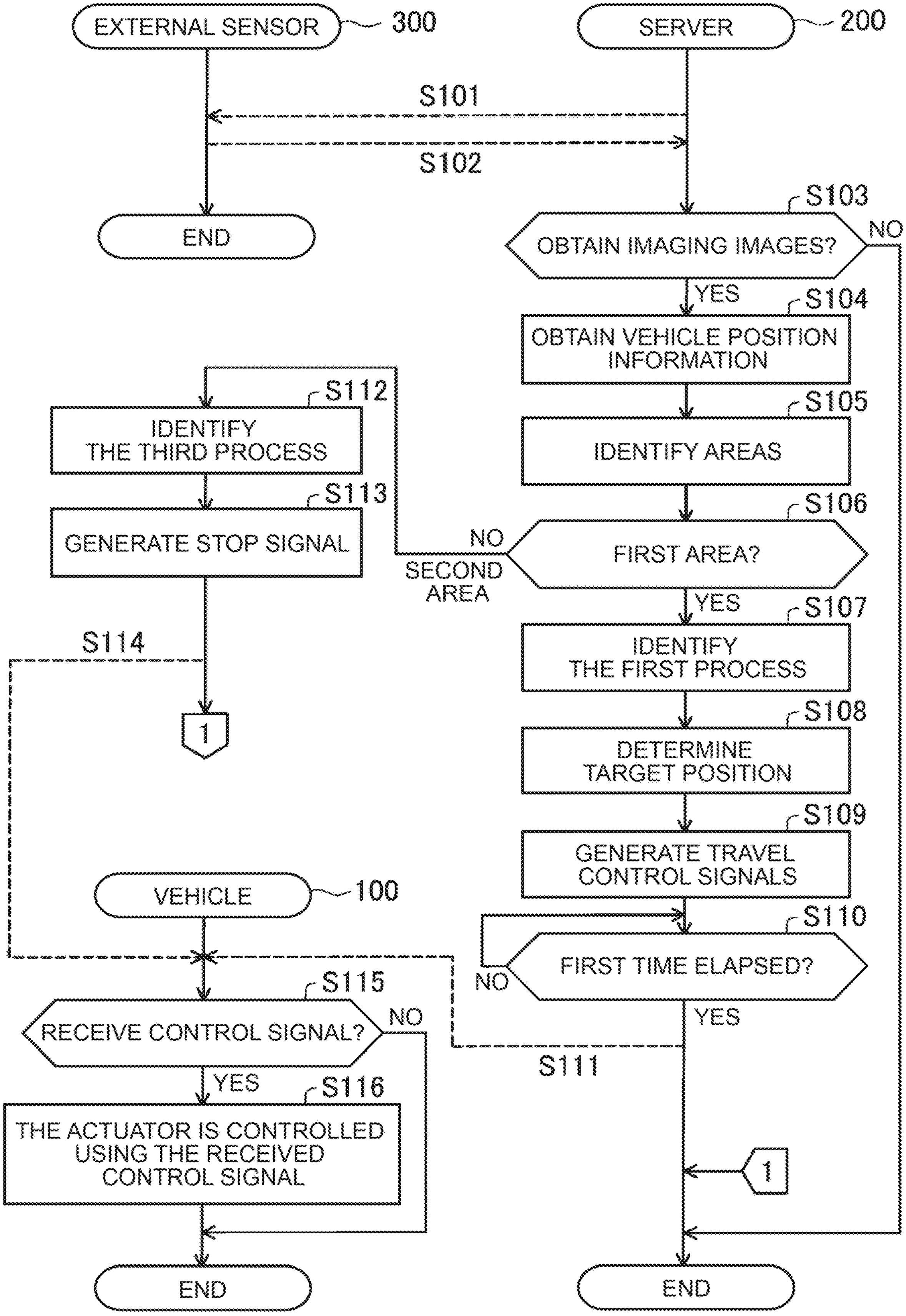
FIG. 4 is a flow chart illustrating a method of controlling a vehicle according to an area in which the vehicle is located.

FIG. 4 is a flow chart showing how to control the vehicle 100 in accordance with the area A1, A2 in which the vehicle 100 is located. In FIG. 4, in the database DB in which the types of the processes P1 to P3 to be executed are associated with the areas A1, A2, the first process P1 is associated with the first area A1 and the third process P3 is associated with the second area A2. In the example illustrated in FIG. 4, when the vehicle 100 is located in the first area A1, such as the first vehicle 101 and the second vehicle 102 illustrated in FIG. 1, the server 200 determines that the collision risk is low, and executes the first process P1 using the travel control signal. Accordingly, the server 200 causes the vehicle 100 to travel. On the other hand, in the example illustrated in FIG. 4, when the vehicle 100 is located in the second area A2 as in the third vehicle 103 illustrated in FIG. 1, the server 200 determines that the collision risk level is high, and executes the third process P3 using the stopping signal. As a result, the server 200 quickly stops the vehicle 100. That is, in the third process P3, the server 200 controls the operation of the vehicle 100 at the timing when it is determined that the collision risk level is high.

In S101, the processor 201 of the server 200 transmits a request signal for acquiring captured images to the external sensor 300. The external sensor 300, which receives the request signal, transmits the captured image to the server 200 at S102. When the server 200 acquires the captured image (S103: Yes), in S104, the processor 201 of the server 200 acquires the vehicle position information using the captured image. In S105, the processor 201 of the server 200 uses the vehicle position information to identify the area A1, A2 in which the vehicle 100 is located.

When the vehicles 100 are located in the first area A1 (S106: Yes), in S107, the processor 201 of the servers 200 identifies the first process P1. In S108, the processor 201 of the servers 200 determines the target location of the vehicles 100. At S109, the processor 201 of the servers 200 generates a travel control signal. When the first time has elapsed from the timing at which the travel control signal was previously transmitted (S110: Yes), the processor 201 of the server 200 transmits the generated travel control signal to the vehicle 100 in S111.

When the vehicle 100 is located in the second area A2 (S106: No), the processor 201 of the server 200 identifies the third process P3 in S112. At S113, the processor 201 of the servers 200 generates a halt signal. In S114, the processor 201 of the server 200 immediately transmits the generated stop signal to the vehicle 100 without considering the timing at which the control signal was transmitted last time.

When the vehicle 100 receives the control signal (S115: Yes), in S116, the processor 111 of the vehicle 100 controls the actuator group 120 using the received control signal. Accordingly, when the vehicle 100 receives the travel control signal, the processor 111 of the vehicle 100 causes the vehicle 100 to travel at the acceleration and the steering angle represented by the travel control signal. When the vehicle 100 receives the stop signal, the processor 111 of the vehicle 100 stops the vehicle 100.

According to the first embodiment, the servers 200 execute the second process P2 of controlling the operation of the vehicles 100 in the second time period shorter than the first time period. This enhances the possibility that the servers 200 can transmit control signaling to the vehicles 100 earlier than when executing the first process P1. Accordingly, the server 200 can reduce the possibility that the timing at which the operation of the vehicle 100 is controlled is delayed by the first time period at the maximum. Further, the servers 200 can immediately transmit control signals to the vehicle 100 by executing a third process P3 for controlling the operation of the vehicle 100 at any timing without having a predetermined time period. Accordingly, the server 200 can further reduce the possibility that the timing of controlling the operation of the vehicle 100 is delayed by the first time period at the maximum. Therefore, the servers 200 can control the operation of the vehicle 100 at appropriate timings by selectively using P3 from a plurality of process P1 for controlling the operation of the vehicle 100 in accordance with the traveling state of the vehicle 100.

Further, according to the above-described first embodiment, when the vehicles 100 are located in the second area A2 in which the danger level is higher than the first area A1, the servers 200 can execute the second process P2 and the third process P3. The second process P2 and the third process P3 can reduce the possibility that the timing for controlling the operation of the vehicles 100 is delayed from the first process P1. As described above, the servers 200 can control the operation of the vehicle 100 at appropriate timings by selectively using P3 from the plurality of process P1 for controlling the operation of the vehicle 100 in accordance with the area A1, A2 in which the vehicle 100 is located.

Further, according to the above-described first embodiment, when the vehicle 100 is located in the second area A2 and urgency is required, the server 200 can reduce the possibility that the timing for controlling the operation of the vehicle 100 is delayed by the first time period at most. This can reduce the possibility that the vehicles 100 collide with the obstacle OB. The urgent case is a case where it is required to avoid the vehicle 100 colliding with the obstacle OB. This may occur, for example, by urgently stopping the vehicle 100, urgently decelerating the vehicle 100, or urgently changing the steering angle of the vehicle 100.

Further, according to the first embodiment, the servers 200 can identify the area A1, A2 in which the vehicle 100 is located by acquiring the coordinates indicating the position of the vehicle 100 as the information regarding the position of the vehicle 100. Note that the server 200 may acquire information indicating the external sensor 300 including the vehicle 100 in the detection range as information regarding the position of the vehicle 100. In this way, since the detection area of the external sensor 300 is determined in advance, the server 200 can specify the area A1, A2 in which the vehicle 100 is located by specifying which external sensor 300 detects the vehicle 100.

Further, according to the above-described first embodiment, the servers 200 can identify the process P1 to P3 based on the position of the vehicles 100 by using the database DB in which the types of the processes P1 to P3 to be executed are associated with the areas A1, A2. Note that P3 may be specified from the process P1 according to the traveling condition and the property of the vehicles 100 by methods other than the database DB.

Further, according to the first embodiment, the servers 200 selectively use P3 from the plurality of process P1 for controlling the operation of the vehicle 100 in accordance with the numbers of obstacle OB present in the area A1, A2 in which the vehicle 100 is located. Thus, the operation of the vehicle 100 can be controlled at an appropriate timing.

Note that the second area A2 may be an area in which the likelihood of the obstacle OB entering the area A1, A2 is higher than that of the first area A1. The higher the likelihood of the obstacle OB entering the area A1, A2, the higher the collision risk. The likelihood of the obstacle OB entering the area A1, A2 can be determined, for example, in the same manner as when identifying the numbers of obstacle OB present in the area A1, A2. The likelihood of the obstacle OB entering the area A1, A2 may be determined according to the properties of each area A1, A2. The property of each area A1, A2 is determined according to, for example, the appearance possibility of a pedestrian. The possibility of the appearance of a pedestrian can be specified by, for example, whether or not a crosswalk, a commuter opening for an employee, or the like is present in the area A1, A2. In this way, the servers 200 can selectively use P3 from the plurality of process P1 for controlling the operation of the vehicle 100 in accordance with the possibility that the obstacle OB enters the area A1, A2 in which the vehicle 100 is located. Thus, the operation of the vehicle 100 can be controlled at an appropriate timing.

In addition, the second area A2 may be an area in which the traveling road TR is narrower than the first area A1. The narrower the traveling road TR, the higher the impact risk. In this way, the operation of the vehicles 100 can be controlled according to the properties of the traveling road TR.

Second Embodiment

In the present embodiment, the acquisition unit 211 acquires, as the situation information, time zone information related to a time zone in which the vehicle 100 travels. The determination unit 212 specifies, in the database DB indicating the types of the processes P1 to P3 to be executed for the respective time zones, the process P1 to P3 of the type associated with the time zone in which the vehicle 100 travels as the process P1 to P3 to be executed by the remote control unit 213. The second time period is a time period in which the collision risk is higher than that in the first time period. The second time period is, for example, a time period in which the number of obstacle OB existing in the vicinity of the vehicles 100 is larger than that in the first time period. As described above, the higher the number of obstacle OB present in the vicinity of the vehicles 100 in the respective time-zones, the higher the collision risk. The number of obstacle OB existing in the vicinity of the vehicles 100 can be specified using, for example, a table indicating the number of obstacle OB for each time zone. In the database DB, the first process P1 is associated with the first time zone. At least one of the second process P2 and the third process P3 is associated with the second time period. When the vehicles 100 travel in the first period, the remote control unit 213 executes the first process P1. When the vehicles 100 travel in the second period, the remote control unit 213 executes at least one of the second process P2 and the third process P3. Other configurations are the same as those of the first embodiment unless otherwise described.

Figure 5:
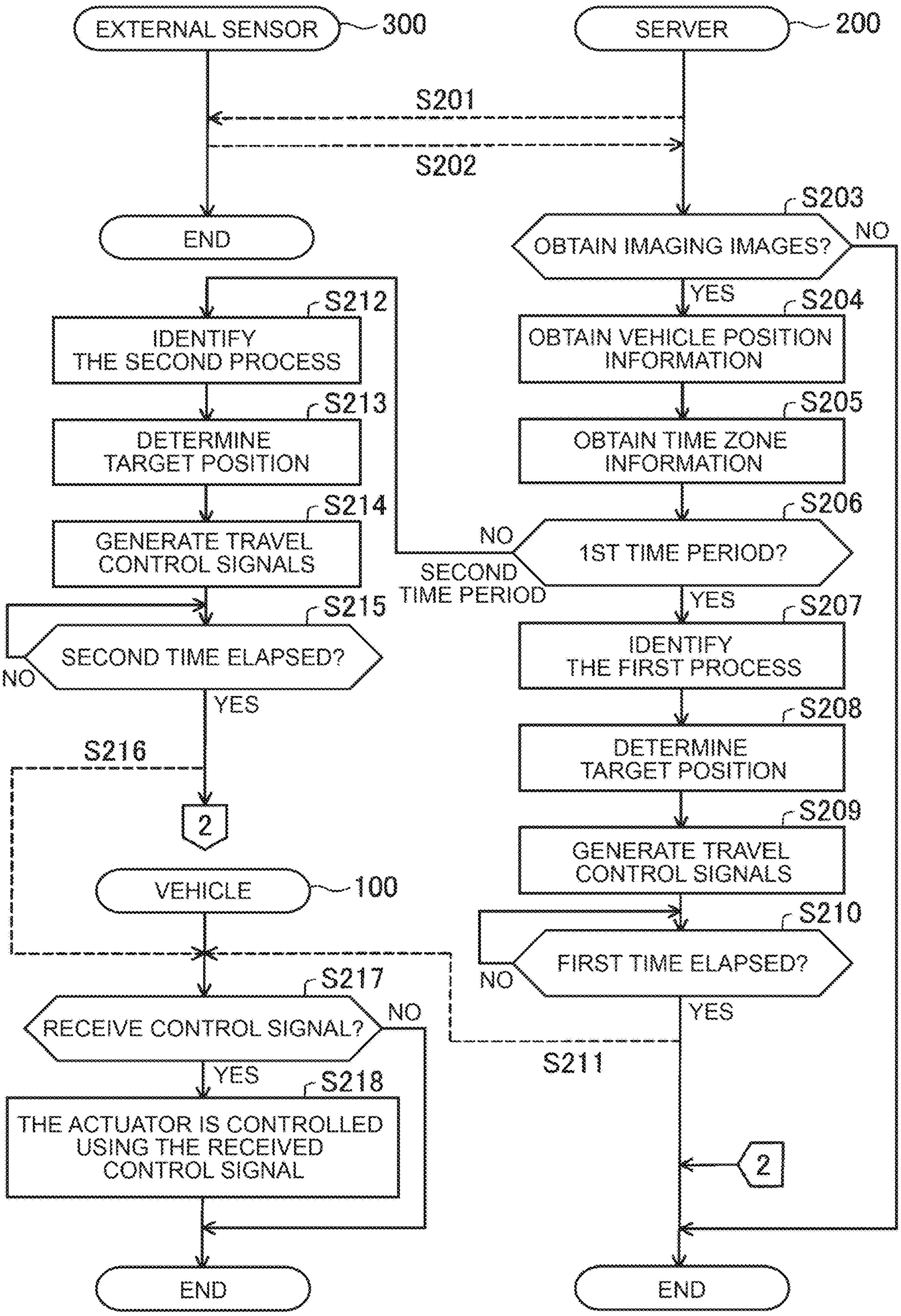
FIG. 5 is a flowchart illustrating a method of controlling a vehicle according to a time period in which the vehicle travels.

FIG. 5 is a flowchart illustrating a control method of the vehicle 100 according to a time period in which the vehicle 100 travels. In FIG. 5, the first process P1 is associated with the first time zone and the second process P2 is associated with the second time zone in the database DB indicating the type of P3 for each time zone from the process P1 to be executed. In the embodiment illustrated in FIG. 5, when the vehicle 100 travels in the first period, the server 200 determines that the collision risk is low, and executes the first process P1 using the travel control signal to cause the vehicle 100 to travel. On the other hand, when the vehicle 100 travels in the second period, the server 200 determines that the collision risk is high, and executes the second process P2 using the travel control signal to cause the vehicle 100 to travel.

In S201, the processor 201 of the server 200 transmits a request signal for acquiring captured images to the external sensor 300. The external sensor 300, which receives the request signal, transmits the captured image to the server 200 at S202. When the server 200 acquires the captured image (S203: Yes), in S204, the processor 201 of the server 200 acquires the vehicle position information using the captured image. In S205, the processor 201 of the server 200 acquires the time-zone data in which the vehicles 100 travel.

When the vehicles 100 travel in the first period (S206: Yes), in S207, the processor 201 of the servers 200 identifies the first process P1. In S208, the processor 201 of the servers 200 determines the target location of the vehicles 100. At S209, the processor 201 of the servers 200 generates a travel control signal. When the first time has elapsed from the timing at which the travel control signal was previously transmitted as the first process P1 (S210: Yes), the processor 201 of the server 200 transmits the generated travel control signal to the vehicle 100 in S211.

When the vehicles 100 travel in the second period (S206: No), in S212, the processor 201 of the servers 200 identifies the second process P2. In S213, the processor 201 of the servers 200 determines the target location of the vehicles 100. At S214, the processor 201 of the servers 200 generates a travel control signal. When the second time shorter than the first time has elapsed from the timing at which the travel control signal was previously transmitted as the second process P2 (S215: Yes), the processor 201 of the server 200 transmits the generated travel control signal to the vehicle 100 in S216.

When the vehicle 100 receives the driving control signal (S217: Yes), the processor 111 of the vehicle 100 executes S218. In S218, the processor 111 of the vehicle 100 controls the actuator group 120 using the received travel control signal, thereby causing the vehicle 100 to travel at the acceleration and the steering angle represented by the travel control signal.

According to the second embodiment, when the vehicles 100 travel in the second time period in which the danger level is higher than the first time period, the servers 200 can execute the second process P2 and the third process P3. The second process P2 and the third process P3 can reduce the possibility that the timing for controlling the operation of the vehicles 100 is delayed from the first process P1. As described above, the servers 200 can control the operation of the vehicle 100 at appropriate timings by selectively using the plurality of processes P1 to P3 for controlling the operation of the vehicle 100 in accordance with the time period in which the vehicle 100 travels.

In addition, according to the second embodiment, the servers 200 can identify P1 of P3 from the processes according to the time zone in which the vehicles 100 travel, using the database DB in which the types of P3 are associated with each time zone from the process P1 to be executed.

Further, according to the second embodiment, the servers 200 selectively use P3 from the plurality of process P1 for controlling the operation of the vehicle 100 for each time zone in accordance with the numbers of obstacle OB existing in the vicinity of the vehicle 100. Accordingly, the server 200 can control the operation of the vehicle 100 at an appropriate timing.

Note that the second time period may be a time period in which the likelihood of the obstacle OB entering the vicinity of the vehicles 100 is higher than the first time period. In this case, the collision risk becomes higher as the obstacle OB is more likely to enter the vicinity of the vehicles 100. The likelihood of the obstacle OB entering the vicinity of the vehicle 100 can be determined in the same manner as in the case of specifying the numbers of obstacle OB existing in the vicinity of the vehicle 100. The likelihood of the obstacle OB entering the surroundings of the vehicles 100 may be determined according to the properties of the respective time-zones. The characteristic of each time zone is determined by, for example, the appearance possibility of a pedestrian. The possibility of occurrence of a pedestrian can be specified by, for example, working hours, attendance hours, departure hours, and rest hours of an employee at a factory FC. The characteristics of each time zone may be determined by the appearance probability of the moving object. The possibility of appearance of the moving object is determined by, for example, an operation plan of the moving object which is operated as a regular flight. In this way, the operation of the vehicle 100 can be controlled at an appropriate timing by selectively using the plurality of processes P1 to P3 for each time zone for controlling the operation of the vehicle 100 in accordance with the possibility that the obstacle OB enters the periphery of the vehicle 100.

The second time period may be a time period in which the visibility of at least one of the external sensor 300 and the internal sensor is lower than that of the first time period. The internal sensor is a sensor mounted on the vehicle 100. The internal sensor is a sensor that detects the surroundings of the vehicle 100, and is, for example, a camera, a LiDAR, or a radar mounted on the vehicle 100. In this case, the lower the visibility of the sensor, the higher the collision risk. In this way, the servers 200 can control the operation of the vehicle 100 at appropriate timings by selectively using the plurality of processes P1 to P3 for controlling the operation of the vehicle 100 in accordance with the visibility of the sensors depending on the time-zone.

Third Embodiment

In the present embodiment, the acquisition unit 211 acquires, as the characteristic information, type information related to the type of the vehicle 100. The determination unit 212 specifies, in the database DB in which the types of the processes P1 to P3 to be executed are associated with the types of the vehicle 100, the process P1 to P3 associated with the type of the vehicle 100 as the process P1 to P3 to be executed by the remote control unit 213. The second type is a type in which the risk of damage is higher than that of the first type. The damage risk degree indicates a degree of damage when the vehicles 100 collide with the obstacle OB. The vehicle 100 of the second type is, for example, the vehicle 100 in which the weight of the vehicle 100 is larger than that of the vehicle 100 of the first type. As described above, the higher the weight of the vehicle 100, the higher the damage risk. When the type of the vehicle 100 is the first type, the remote control unit 213 executes the first process P1. When the type of the vehicle 100 is the second type, the remote control unit 213 executes at least one of the second process P2 and the third process P3. Other configurations are the same as those of the first embodiment unless otherwise described.

Figure 6:
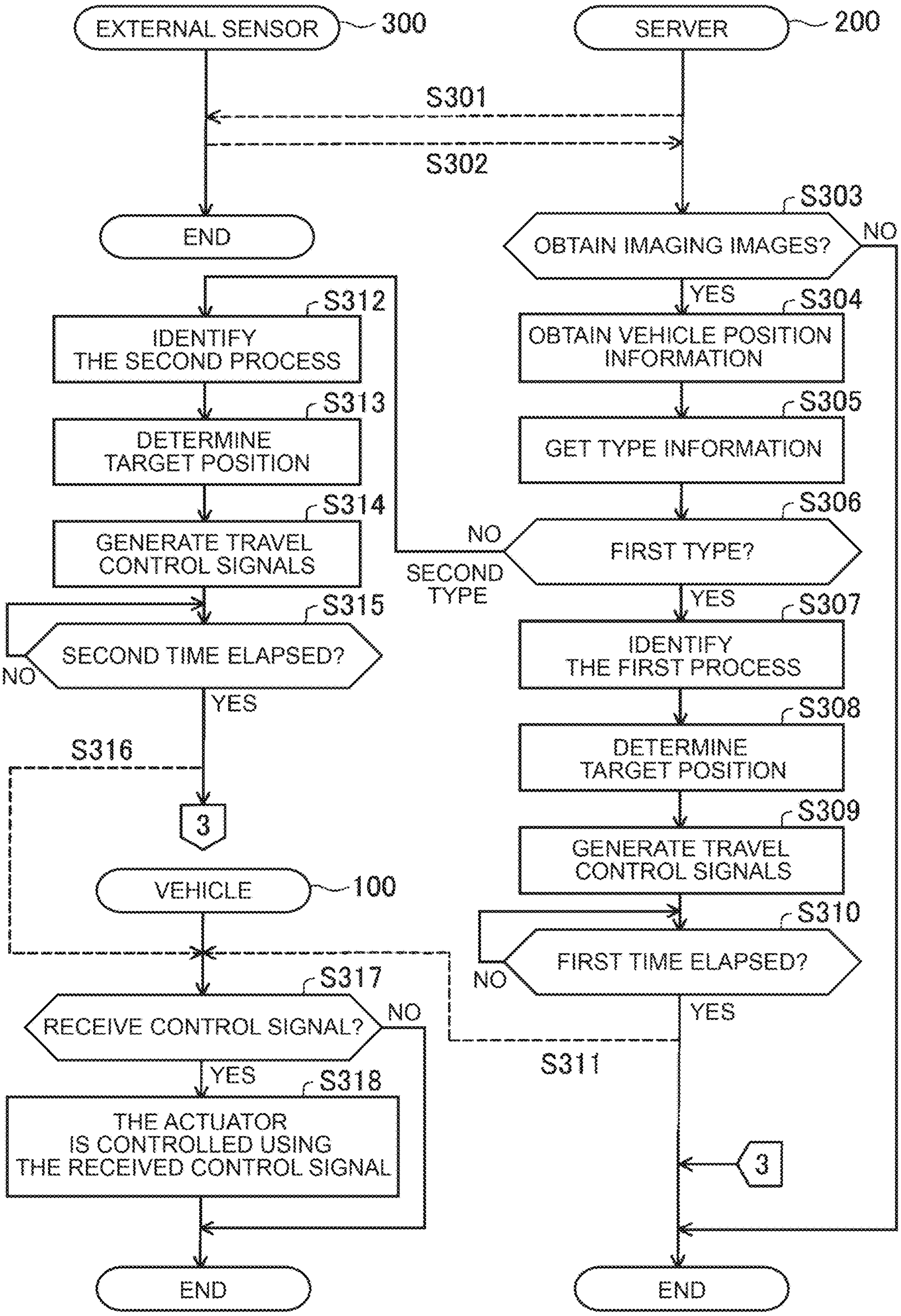
FIG. 6 is a flowchart illustrating a method of controlling a vehicle according to a type of the vehicle.

FIG. 6 is a flowchart illustrating a control method of the vehicle 100 according to the type of the vehicle 100. FIG. 6 illustrates an example in which the first process P1 is associated with the first type and the second process P2 is associated with the second type in the database DB indicating the type of P3 for each time zone from the process P1 to be executed. In the example illustrated in FIG. 6, when the type of the vehicle 100 is the first type, the server 200 determines that the risk of damage is low, and executes the first process P1 using the travel control signal to cause the vehicle 100 to travel. When the type of the vehicle 100 is the second type, the server 200 determines that the risk of damage is high, and executes the second process P2 using the travel control signal to cause the vehicle 100 to travel.

In S301, the processor 201 of the server 200 transmits a request signal for acquiring captured images to the external sensor 300. The external sensor 300, which receives the request signal, transmits the captured image to the server 200 at S302. When the server 200 acquires the captured image (S303: Yes), in S304, the processor 201 of the server 200 acquires the vehicle position information using the captured image. In S305, the processor 201 of the server 200 acquires the type information.

When the type of the vehicle 100 is the first type (S306: Yes), the processor 201 of the server 200 identifies the first process P1 in S307. In S308, the processor 201 of the servers 200 determines the target location of the vehicles 100. At S309, the processor 201 of the servers 200 generates a travel control signal. When the first time has elapsed from the timing at which the travel control signal was previously transmitted as the first process P1 (S310: Yes), the processor 201 of the server 200 transmits the generated travel control signal to the vehicle 100 in S311.

When the type of the vehicle 100 is the second type (S306: No), the processor 201 of the server 200 identifies the second process P2 in S312. In S313, the processor 201 of the servers 200 determines the target location of the vehicles 100. At S314, the processor 201 of the servers 200 generates a travel control signal. When the second time has elapsed from the timing at which the travel control signal was previously transmitted as the second process P2 (S315: Yes), the processor 201 of the server 200 transmits the generated travel control signal to the vehicle 100 in S316.

When the vehicle 100 receives the driving control signal (S317: Yes), the processor 111 of the vehicle 100 executes S318. In S318, the processor 111 of the vehicle 100 controls the actuator group 120 using the received travel control signal, thereby causing the vehicle 100 to travel at the acceleration and the steering angle represented by the travel control signal.

According to the third embodiment, the servers 200 can control the operation of the vehicle 100 at appropriate timings by selectively using the plurality of processes P1 to P3 for controlling the operation of the vehicle 100 according to the type of the vehicle 100 that determines the characteristic of the vehicle 100. Note that the characteristics of the vehicle 100 may be determined by a type other than the type of the vehicle 100.

Further, according to the above-described third embodiment, when the risk of damage is the second type higher than the first type, the server 200 can execute the second process P2 and the third process P3 that can reduce the possibility that the timing for controlling the operation of the vehicle 100 is delayed from the first process P1. As described above, the servers 200 can control the operation of the vehicle 100 at appropriate timings by selectively using the plurality of processes P1 to P3 for controlling the operation of the vehicle 100 according to the type of the vehicle 100.

Further, according to the above-described third embodiment, the server 200 can specify the process P1 to P3 according to the type of the vehicle 100 using the database DB in which the types of the processes P1 to P3 to be executed are associated with the types of the vehicle 100.

Further, according to the third embodiment, the operation of the vehicle 100 can be controlled at an appropriate timing by selectively using the plurality of processes P1 to P3 for controlling the operation of the vehicle 100 according to the weight of the vehicle 100.

Note that the vehicle 100 of the first type may be equipped with more safety equipment than the vehicle 100 of the second type. In this case, the more the safety equipment is mounted in the vehicle 100, the lower the risk of damage. Further, the vehicle 100 of the first type may be equipped with a safety device having higher safety than the safety device installed in the vehicle 100 of the second type. In this case, the higher the safety of the safety equipment mounted on the vehicle 100, the lower the risk of damage. The safety equipment is equipment for preventing the vehicle 100 from colliding with the obstacle OB and reducing damage when the vehicle 100 collides with the obstacle OB. The safety equipment is, for example, a braking device. In this case, the first type of vehicle 100 is equipped with a braking device having a shorter braking distance than, for example, a braking device installed in the second type of vehicle 100. The safety equipment may be equipment that realizes active safety, such as an inter-vehicle distance control device, or may be equipment that realizes passive safety, such as a shock absorbing body that absorbs external shock. In this way, the operation of the vehicle 100 can be controlled at appropriate timings by selectively using the plurality of processes P1 to P3 for controlling the operation of the vehicle 100 in accordance with the number and type of safety equipment mounted on the vehicle 100.

Fourth Embodiment

Figure 7:
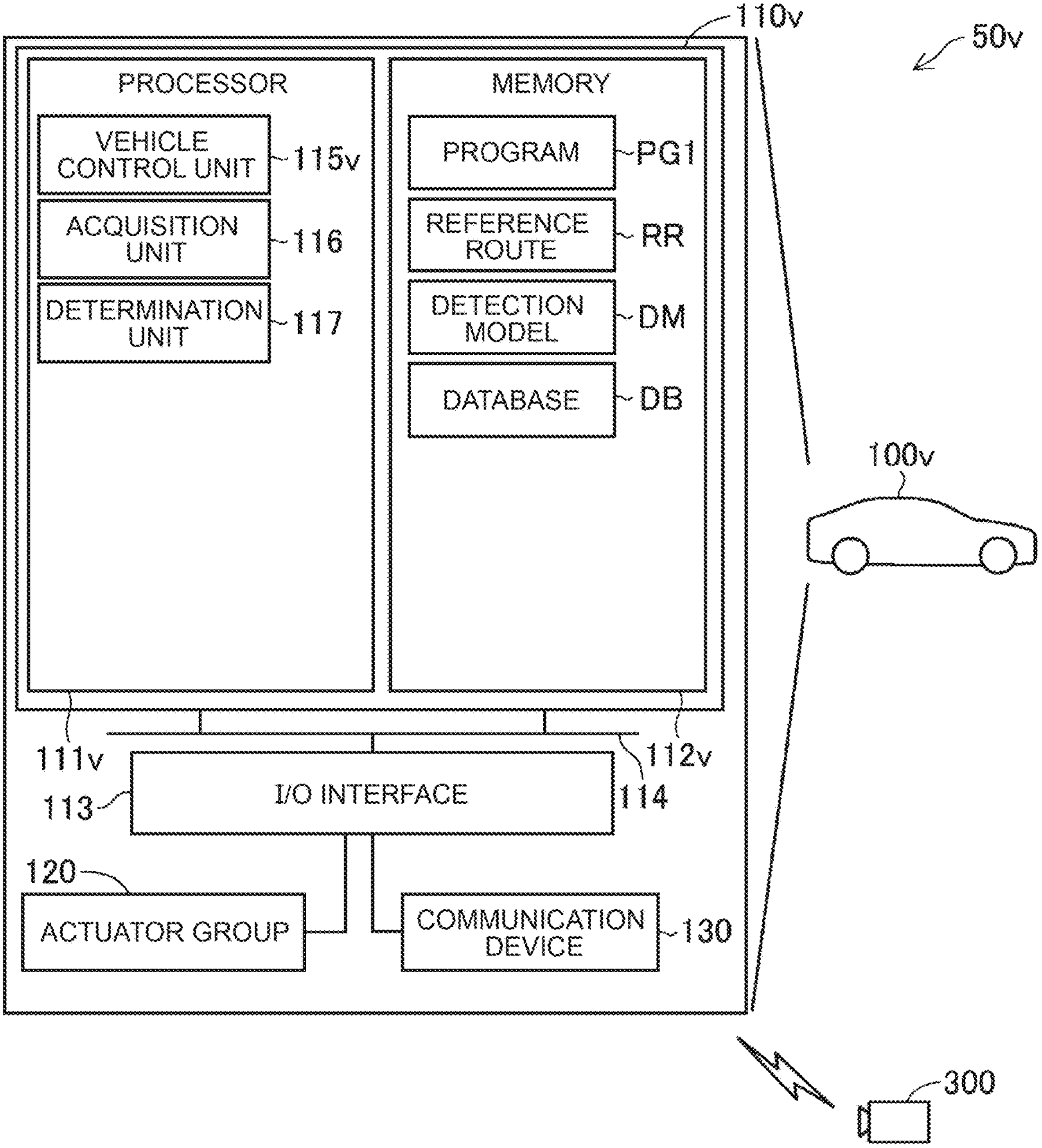
FIG. 7 is an explanatory view showing a schematic configuration of a device according to a fourth embodiment.

FIG. 7 is an explanatory diagram illustrating a schematic configuration of a system 50*v* according to a fourth embodiment. This embodiment differs from the first embodiment in that the system 50*v* does not include the servers 200. The vehicle 100*v* according to the present embodiment can travel by autonomous control of the vehicle 100*v*. In the present embodiment, the function of the "control device" in the present disclosure is realized by the vehicle control device 110*v*. Other configurations are the same as those of the first embodiment unless otherwise described.

In the present embodiment, the processor 111*v* of the vehicle control device 110*v* functions as the acquisition unit 116, the determination unit 117, and the vehicle control unit 115*v* by executing the program PG1 stored in the memory 112*v*. The acquisition unit 116 acquires vehicle information. The determination unit 117 specifies P3 from the process P1 corresponding to the vehicle-information. The vehicle control unit 115*v* uses the vehicle information to control the operation of the vehicle 100*v* by executing at least one process P1 to P3 out of the first process P1, the second process P2, and the third process P3. In the present embodiment, in addition to the program PG1, the detection model DM and the reference route RR are stored in advance in the memory 112*v*.

Figure 8:
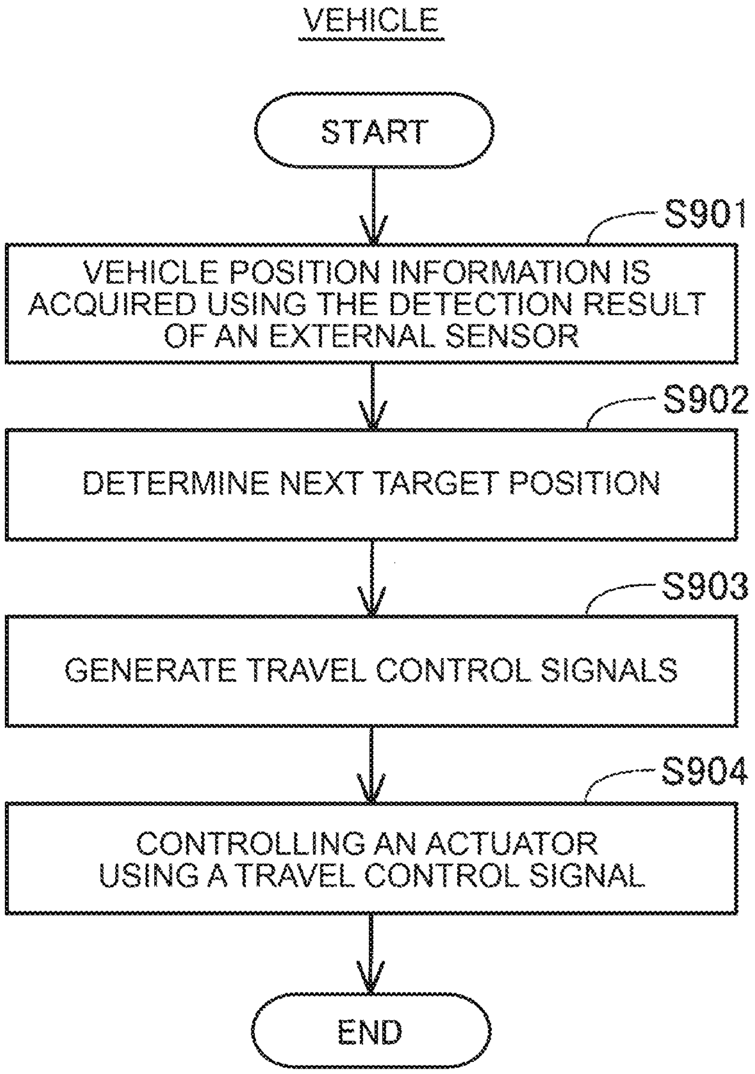
FIG. 8 is a flowchart illustrating a processing procedure of travel control of the vehicle according to the fourth embodiment.

FIG. 8 is a flow chart showing a process sequence of travel control of the vehicle 100*v* according to the fourth embodiment. In the process of FIG. 8, the processor 111*v* of the vehicle 100*v* functions as the vehicle control unit 115*v* by executing the program PG1.

In S901, the processor 111*v* of the vehicle control device 110*v* acquires the vehicle position information using the detection result outputted from the camera as the external sensor 300. In S902, the processor 111*v* determines the target position to which the vehicle 100*v* should be headed next. In S903, the processor 111*v* generates a travel control signal for causing the vehicle 100*v* to travel toward the determined target position. In S904, the processor 111*v* controls the actuator group 120 by using the generated travel control signal, thereby causing the vehicle 100*v* to travel in accordance with the parameter represented by the travel control signal. The processor 111*v* repeats acquiring the vehicle position information, determining the target position, generating the travel control signal, and controlling the actuator at a predetermined cycle. According to the system 50*v* of the present embodiment, the vehicle 100*v* can be driven by the autonomous control of the vehicle 100*v* without remotely controlling the vehicle 100*v* by the servers 200.

According to the fourth embodiment, the vehicle control device 110*v* executes the second process P2 of controlling the operation of the vehicle 100*v* in the second time period shorter than the first time period. This increases the possibility that the operation of the vehicle 100*v* can be changed more quickly than when the first process P1 is executed. Accordingly, the vehicle control device 110*v* can reduce the possibility that the timing for controlling the operation of the vehicle 100*v* is delayed by the first time period at the largest.

Further, the vehicle control device 110*v* can quickly change the operation of the vehicle 100*v* by executing the third process P3 of controlling the operation of the vehicle 100*v* at any timing without having a predetermined time period. Accordingly, the vehicle control device 110*v* can further reduce the possibility that the timing for controlling the operation of the vehicle 100*v* is delayed by the first time period at the largest. Therefore, the vehicle control device 110*v* can control the operation of the vehicle 100*v* at appropriate timings by selectively using a plurality of processes P1 to P3 for controlling the operation of the vehicle 100*v* in accordance with the traveling state of the vehicle 100*v*.

Other Embodiments (E1) In each of the first process P1 and the second process P2, control signals may be transmitted and received in different systems. In each of the first process P1 and the third process P3, control signals may be transmitted and received in different systems. For example, when a control signal is transmitted from the same server 200 as the first process P1 to the vehicle 100, 100*v* by using the same communication line as the first process P1, the following may be used. In the second process P2 and the third process P3, the vehicle 100, 100*v* may receive a control signal from a communication port other than the first process P1. In this way, the first process P1, the second process P2, and the third process P3 can receive control signals from the servers 200 in different systems. Further, in the second process P2 and the third process P3, the control signal may be transmitted to the vehicle 100, 100*v* from the servers 200 that differ from the first process P1. In this manner, the system 50 can transmit the control signaling to the vehicle 100, 100*v* in a separate system with the first process P1, the second process P2, and the third process P3. Accordingly, even when any one of the plurality of servers 200 is unable to transmit a control signal to the vehicle 100, 100*v* due to a failure or the like, the control signal can be transmitted from the other servers 200 to the vehicle 100, 100*v*. Thus, the operation of the vehicle 100, 100*v* can be controlled. Therefore, it is possible to avoid a situation in which the operation of the vehicle 100, 100*v* cannot be controlled at appropriate timings.

(E2) In each of the first process P1 and the second process P2, communication between the vehicle 100, 100*v* and the outside may be performed in another system. In each of the first process P1 and the third process P3, communication between the vehicle 100, 100*v* and the outside may be performed in another system. In the second process P2 and the third process P3, the vehicle 100, 100*v* may acquire the information from the outside by using a communication method that differs from the first process P1. The communication methods used for P3 from the respective process P1 are, for example, 3G/4G/5G communication, LTE communication, and Wi-Fi communication. In this way, even when a trouble occurs in communication using a particular communication method, the vehicle 100, 100*v* can communicate with the outside by using another communication method. Further, in the second process P2 and the third process P3, the vehicle 100, 100*v* may acquire data from the outside by using a communication line that differs from the first process P1. In this way, even when a trouble occurs in communication using a particular communication line, the vehicle 100, 100*v* can communicate with the outside by using another communication line. Therefore, it is possible to avoid a situation in which the operation of the vehicle 100, 100*v* cannot be controlled at appropriate timings.

(E3) The control device 110*v*, 200 such as the vehicle control device 110*v* and the server 200 may execute P3 from the process P1 corresponding to the vehicle information by using a plurality of types of vehicle information. In this way, the control device 110*v*, 200 can control the operation of the vehicle 100, 100*v* at a more appropriate timing.

(E4) The control device **110*v*, 200 may further execute at least one of the first process P1 and the third process P3 when executing the second process P2. The control device 110*v*, 200 may further execute at least one of the first process P1 and the second process P2 when executing the third process P3. In this way, the control device 110*v*, 200 can control the operation of the vehicle 100, 100*v*** at a more appropriate timing.

(E5) When the vehicle **100, 100*v* is located in the second area A2, the control device 110*v*, 200 may execute the second process P2. Even in this manner, the control device 110*v*, 200 can execute the second process P2 of controlling the operation of the vehicles 100 in the second time period shorter than the first time period. Accordingly, the control device 110*v*, 200 can increase the possibility of transmitting the control signal to the vehicle 100, 100*v* earlier than when the first process P1 is executed. Therefore, the control device 110*v*, 200 can control the operation of the vehicle 100, 100*v*** at appropriate timings.

(E6) When the vehicle **100, 100*v* travels in the second period, the control device 110*v*, 200 may execute the third process P3. For example, the control device 110*v*, 200 may control the operation of the vehicle 100, 100*v* by executing at least one of the first process P1 and the second process P2 prior to the determination that urgency is required. Then, the control device 110*v*, 200 may immediately control the operation of the vehicle 100, 100*v* by executing the third process P3 at a timing at which it is determined that urgency is required. In this way, the control device 110*v*, 200 can quickly control the operation of the vehicle 100, 100*v* when an emergency is required in the second period in which the collision risk is higher. Therefore, the control device 110*v*, 200 can control the operation of the vehicle 100, 100*v*** at appropriate timings.

(E7) When the type of the vehicle **100, 100*v* is the second type, the control device 110*v*, 200 may execute the third process P3. For example, the control device 110*v*, 200 may control the operation of the vehicle 100, 100*v* by executing at least one of the first process P1 and the second process P2 prior to the determination that urgency is required. Then, the control device 110*v*, 200 may immediately control the operation of the vehicle 100, 100*v* by executing the third process P3 at a timing at which it is determined that urgency is required. In this way, the control device 110*v*, 200 can quickly control the operation of the vehicle 100, 100*v* when an urgent situation is required in the second vehicle type having a higher risk of damage. Therefore, the control device 110*v*, 200 can control the operation of the vehicle 100, 100*v*** at appropriate timings.

(E8) In each of the above-described embodiments, the external sensor 300 is not limited to a camera, and may be, for example, a distance measuring device. The distance measuring device is, for example, a LiDAR (Light Detection And Ranging). The external sensor 300 may be three-dimensional point cloud data representing the vehicle **100, 100*v*. In this case, the servers 200 and the vehicle 100, 100*v*** may acquire the vehicle position data by template matching using the three-dimensional point cloud data and the reference-point cloud data prepared in advance.

(E9) In each of the embodiments from the first embodiment to the third embodiment, the server 200 executes the process from acquisition of vehicle position information to generation of a travel control signal. On the other hand, at least a part of the process from the acquisition of the vehicle position information to the generation of the travel control signal may be executed by the vehicle 100. For example, the following aspects (1) to (3) may be used.

(1) The server 200 may acquire the vehicle position information, determine a target position to which the vehicle 100 should be heading next, and generate a route from the current position of the vehicle 100 represented by the acquired vehicle position information to the target position. The server 200 may generate a route to a target position between the current location and the destination, or may generate a route to the destination. The server 200 may transmit the generated route to the vehicle 100. The vehicle 100 may generate a travel control signal so that the vehicle 100 travels on the route received from the server 200, and control the actuator group 120 using the generated travel control signal.

(2) The server 200 may acquire the vehicle position information and transmit the acquired vehicle position information to the vehicle 100. Vehicle 100 may determine a target position to which vehicle 100 should be heading next. Then, the vehicle 100 may generate a route from the current position of the vehicle 100 to the target position represented by the received vehicle position information. Further, the vehicle 100 may generate a travel control signal such that the vehicle 100 travels on the generated route. Further, the vehicle 100 may control the actuator group 120 using the generated travel control signal.

(3) In the above aspects (1) and (2), an internal sensor may be mounted on the vehicle 100, and a detection result output from the internal sensor may be used for at least one of generation of a route and generation of a travel control signal. The internal sensor may include, for example, a sensor that detects a motion state of the vehicle 100, a sensor that detects an operation state of each unit of the vehicle 100, and a sensor that detects an environment around the vehicle 100. Specifically, the inner sensor may include, for example, a camera, a LiDAR, a millimeter-wave radar, an ultrasonic sensor, a GPS sensor, an accelerometer, a gyroscope, and the like. For example, in the aspect (1), the server 200 may acquire the detection result of the internal sensor and reflect the detection result of the internal sensor in the path when generating the path. In the aspect (1), the vehicle 100 may acquire the detection result of the internal sensor and reflect the detection result of the internal sensor in the travel control signal when generating the travel control signal. In the aspect (2), the vehicle 100 may acquire the detection result of the internal sensor and reflect the detection result of the internal sensor in the path when generating the path. In the aspect (2), the vehicle 100 may acquire the detection result of the internal sensor and reflect the detection result of the internal sensor in the travel control signal when generating the travel control signal.

(E10) In the fourth embodiment, an internal sensor may be mounted on the vehicle **100*v*, and a detection result outputted from the internal sensor may be used for at least one of generation of a route and generation of a travel control signal. For example, the vehicle 100*v* may acquire the detection result of the internal sensor and reflect the detection result of the internal sensor in the route when generating the route. The vehicle 100*v*** may acquire the detection result of the internal sensor and reflect the detection result of the internal sensor in the travel control signal when generating the travel control signal.

(E11) In the fourth embodiment, the vehicle **100*v* acquires the vehicle position information using the detection result of the external sensor 300. On the other hand, an inner sensor may be mounted on the vehicle 100*v*. The vehicle 100*v* may acquire vehicle position information using the detected results of the inner sensors and determine a target position to which the vehicle 100*v* should face next. Further, the vehicle 100***v* may generate a route from the current position of the vehicle 100*v* represented by the acquired vehicle position information to the target position, and generate a travel control signal for traveling on the generated route. Further, the vehicle 100*v* may control the actuator group 120 using the generated travel control signal. In this case, the vehicle 100*v* can travel without using the detection result of the external sensor 300 at all. The vehicle 100*v* may acquire the target arrival time and the traffic jam information from the outside of the vehicle 100*v* and reflect the target arrival time and the traffic jam information on at least one of the route and the travel control signal. In addition, all the functional configurations of the system 50*v* may be provided in the vehicle 100*v*. That is, the process implemented by the system 50*v* may be implemented by the vehicle 100*v* alone.

(E12) In each of the embodiments from the first embodiment to the third embodiment, the server 200 automatically generates a travel control signal to be transmitted to the vehicle 100. On the other hand, the server 200 may generate a travel control signal to be transmitted to the vehicle 100 in accordance with an operation of an external operator located outside the vehicle 100. The control device may be operated by an external operator, and the server 200 may generate a travel control signal corresponding to the operation applied to the control device. The control device may include, for example, a display for displaying a captured image output from the external sensor 300, a steering for remotely controlling the vehicle 100, an accelerator pedal, a brake pedal, and a communication device for communicating with the server 200 through wired communication or wireless communication.

(E13) In the above-described embodiments, the vehicle 100, 100*v* may have a configuration that can be moved by unmanned driving, and may be, for example, in the form of a platform that includes the configuration described below. Specifically, the vehicle 100, 100*v* may include at least a vehicle control device 110, 110*v* and an actuator group 120 in order to perform three functions of "running," "turning," and "stopping" by unmanned driving. When the vehicle 100, 100*v* acquires information from the outside for unmanned driving, the vehicle 100, 100*v* may further include a communication device 130. That is, the vehicle 100, 100*v* that can be moved by the unmanned driving may not be equipped with at least a part of the interior components such as the driver's seat and the dashboard. Further, the vehicles 100 and 100*v* may not be provided with at least a part of exterior components such as bumpers and fenders, and may not be provided with a body shell. In this instance, the remaining components, such as the body shell, may be mounted on the vehicle 100, 100*v* until the vehicle 100, 100*v* is shipped from the factory FC. Alternatively, the remaining components such as the body shell may be mounted to the vehicle 100, 100*v* after the vehicle 100, 100*v* is shipped from the factory FC with the remaining components such as the body shell not being mounted to the vehicle 100, 100*v*. Each component may be attached from any direction, such as the upper, lower, front, back, right or left side of the vehicle 100, 100*v*, may be attached from the same direction, each may be attached from different directions. It should be noted that the position determination can be performed in the same manner as in the vehicle 100, 100*v* according to the first embodiment.

(E14) The vehicle 100, 100*v* may be manufactured by combining a plurality of modules. Modules refer to units composed of one or more components grouped according to the configuration and function of the vehicle 100, 100*v*. For example, a vehicle 100, 100*v* may be manufactured by combining a front module, a central module, and a publication module. The front module constitutes the front of the platform. The central module constitutes the central part of the platform. The rear module constitutes the rear of the platform. The number of modules constituting the platform is not limited to three, and may be two or less or four or more. Also, in addition to or instead of the platform, parts of the vehicle 100, 100*v* that differ from the platform may be modularized. Further, the various modules may include any exterior parts such as bumpers and grills, and any interior parts such as sheets and consoles. In addition, the present disclosure is not limited to a vehicle 100, 100*v*, and a moving object of any aspect may be manufactured by combining a plurality of modules. Such a module may be manufactured, for example, by joining a plurality of parts by welding, a fixture, or the like, or may be manufactured by integrally molding at least a part of the module as one part by casting. Molding techniques for integrally molding at least a portion of a module as one part are also referred to as gigacasts or megacasts. By using the gigacast, each part of the moving object, which has been conventionally formed by joining a plurality of parts, can be formed as one part. For example, the front module, the central module, and the rear module described above may be manufactured using gigacast.

(E15) Transporting the vehicle 100, 100*v* by using the traveling of the vehicle 100, 100*v* by the unmanned driving is also referred to as "self-propelled conveyance". A configuration for realizing self-propelled conveyance is also referred to as a "vehicle remote control autonomous traveling conveyance system". Further, a production method of producing a vehicle 100, 100*v* by using self-propelled conveyance is also referred to as "self-propelled production". In self-propelled manufacturing, for example, at least a part of the conveyance of the vehicle 100, 100*v* is realized by self-propelled conveyance in a factory FC that manufactures the vehicle 100, 100*v*.

(E16) In each of the above-described embodiments, some or all of the functions and processes implemented in software may be implemented in hardware. In addition, some or all of the functions and processes implemented in hardware may be implemented in software. For example, various circuits such as an integrated circuit and a discrete circuit may be used as hardware for realizing various functions in the above-described embodiments.

The present disclosure is not limited to each of the above embodiments, and can be realized by various configurations without departing from the spirit thereof. For example, the technical features of the embodiments corresponding to the technical features in the respective embodiments described in Summary can be appropriately replaced or combined in order to solve some or all of the above-described problems or to achieve some or all of the above-described effects. Further, when the technical features are not described as essential in the present specification, these can be deleted as appropriate.

What is claimed is:

1. A control device configured to control an operation of a moving object movable by unmanned driving, the control device comprising:

a processor; and a memory storing instructions that are executable by the processor and that cause the processor to acquire position information of the moving object from a captured image output from an external sensor located outside the moving object, identify, using a database in which types of processes are associated with areas, whether the moving object is located in a first area or a second area having a higher collision risk than the first area, in a case where the moving object is located in the first area, execute a first process including generating a travel control signal and transmitting the travel control signal to the moving object after a predetermined first time has elapsed from a timing at which a previously generated travel control signal was transmitted, and in a case where the moving object is located in the second area, execute at least one of a second process and a third process, wherein the second process includes generating a travel control signal and transmitting the travel control signal to the moving object after a second time that is shorter than the predetermined first time has elapsed from a timing at which a previously generated travel control signal was transmitted, and the third process includes generating a stop signal and immediately transmitting the stop signal to the moving object without considering a timing at which a previously transmitted control signal was transmitted.

2. The control device according to claim 1, wherein the position information includes coordinates indicating a position of the moving object.

* * * * *